United States Patent [19]

Hostetler

[11] 4,344,456
[45] Aug. 17, 1982

[54] PRESSURE RESPONSIVE LIQUID FLOW REGULATOR

[76] Inventor: Eldon Hostetler, 15110 County Rd. 20, Middlebury, Ind. 46540

[21] Appl. No.: 836,387

[22] Filed: Sep. 26, 1977

[51] Int. Cl.³ .............................................. F16K 21/18
[52] U.S. Cl. ............................... 137/403; 137/505.46; 137/505.47
[58] Field of Search ...................... 137/505.46, 505.47, 137/403; 92/101, 102

[56] References Cited

U.S. PATENT DOCUMENTS

Re. 13,631 10/1913 Park .
2,059,104 10/1936 Harrah .
2,987,074 6/1961 Niesemann .
3,003,520 10/1961 Corey .
3,339,581 9/1967 Courtot .

Primary Examiner—Harold W. Weakley
Attorney, Agent, or Firm—Oltsch, Knoblock & Hall

[57] ABSTRACT

A regulator for controlling the liquid level in a liquid supply system having a discharge part located at an elevation higher than the elevation of the regulator. The regulator is characterized by a housing spanned by a diaphragm to define two chambers including a liquid chamber with which the intake and outlet of the regulator are connected and within which is located a lever mounting at one end a valve for sealing said intake in one position of the lever and connected at its opposite end to said diaphragm to be pivoted by the diaphragm. The other chamber of the housing receives a spring for urging said diaphragm to valve-opening position. An adjusting member projects from and is manually accessible externally of said housing and is actuable to vary the pressure exerted against said diaphragm by said spring.

1 Claim, 6 Drawing Figures

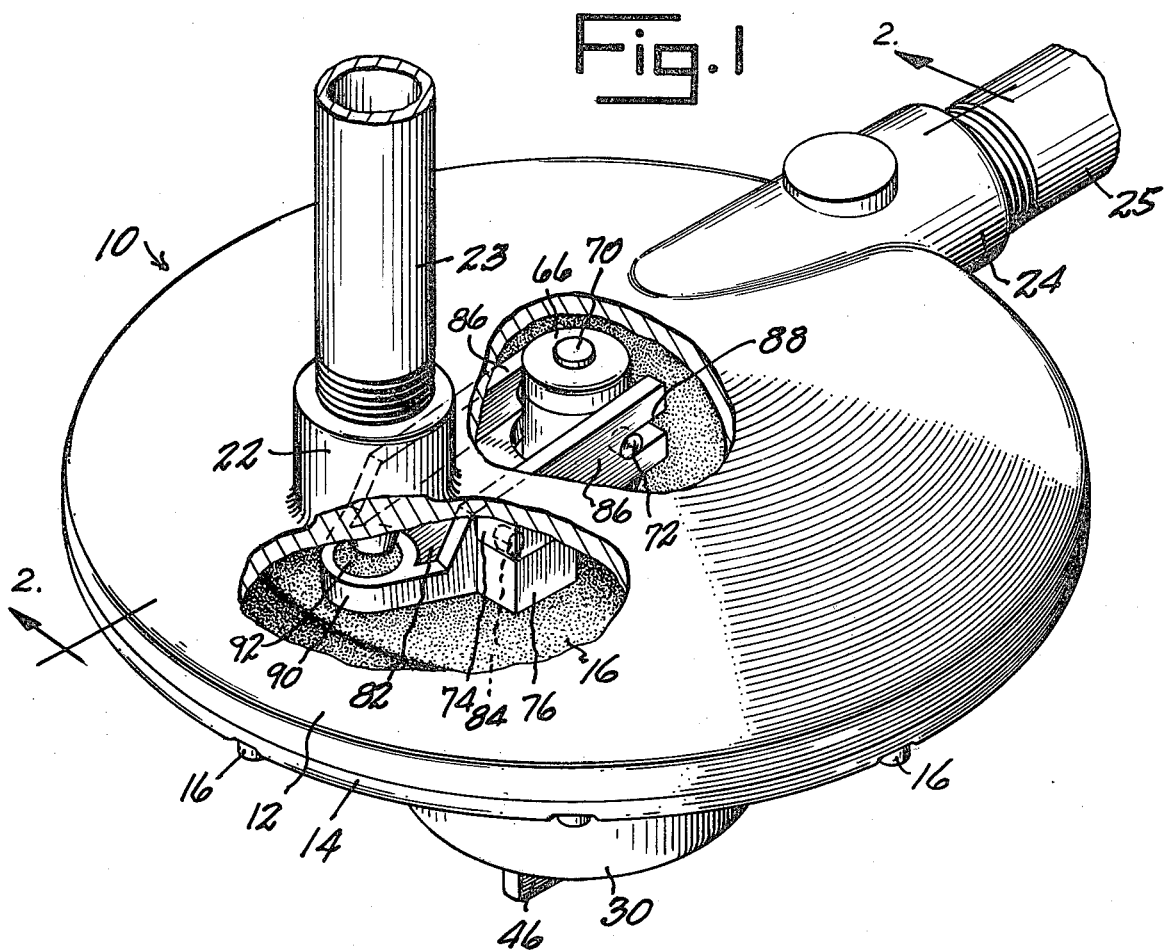
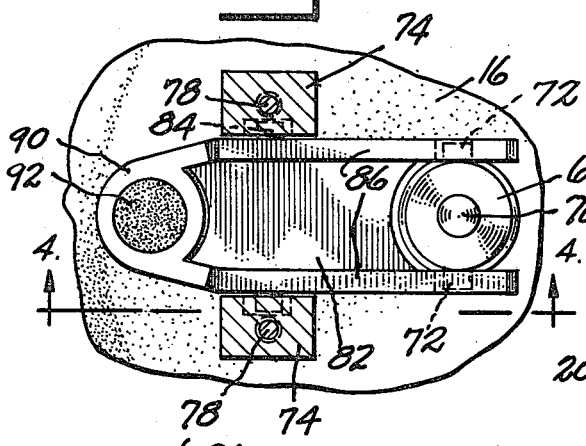
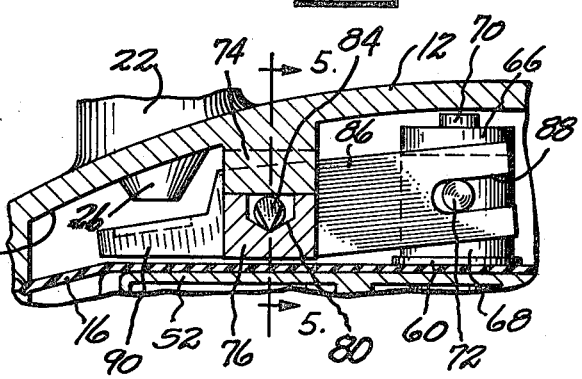
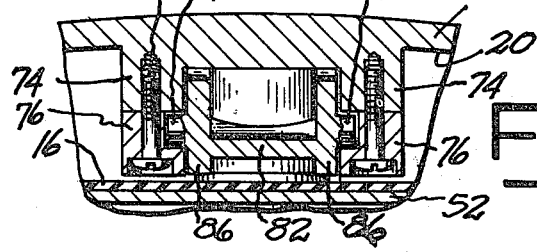

PRESSURE RESPONSIVE LIQUID FLOW REGULATOR

SUMMARY OF THE INVENTION

This invention relates to improvements in pressure responsive liquid flow regulators.

Pressure responsive liquid flow regulators are employed in liquid supply systems having one or more outlets or delivery stations at which a quantity of water is always available at or adjacent a selected level or in a selected quantity. An example of such a system is a poultry or animal watering unit which serves to supply water at a number of stations, stalls or cages, as at cups of small volume or through nipples, both designed to avoid exposure of substantial quantities of water to the air to minimize reaction of the water to the air which tends to deposit growths in the water. Such a system ensures that the water which is ingested by the poultry or animals is always fresh. Also, since the composition of water differs in different areas with respect to its content of iron and other minerals or materials which tend on exposure to air to promote the growth of algae or to create a brackish condition, minimum exposure of water to the air in a watering system is important.

Heretofore, various types of devices have been employed to ensure the presence of a selected or desirable quantity of water at each delivery point in a system, and such devices have principally relied upon valves controlled by floats. Float controls are unreliable in low pressure systems where operation is desirable in response to small variations in water level at a delivery point. Regulators utilizing diaphragms as control elements, such as shown in Australian Pat. No. 128,252, dated Jan. 12, 1961, have had disadvantages because in most instances they have required passage of a water line or conduit through a diaphragm, necessitating movement of the diaphragm with reference to the water line which creates a problem of securing desired freedom of movement of the diaphragm while avoiding leakage at the diaphragm opening through which the supply conduit passes.

The principal object of this invention is to provide a novel, simple, inexpensive, reliable pressure responsive liquid flow regulator which is sensitive to small changes in water pressure acting on a diaphragm and which avoids exposure of any substantial quantity of water in a watering system to air.

A further object is to provide a unit having a diaphragm responsive to small variations in pressure in a system caused by small changes of water level at a delivery point.

A further object is to provide a device of this character having a housing spanned by a diaphragm and mounting pressure regulating means at one side of the diaphragm and having an inlet, an outlet and a control valve at the opposite side of the diaphragm.

A further object is to provide a device of this character having an inlet valve which is controlled by a lever which responds to small increments of movement of a diaphragm.

A further object is to provide a device of this character having means for adjusting spring pressure which is positive in action and includes a coil spring, means for guiding the spring incident to adjustment and to diaphragm movement, and positive spring adjusting means.

A further object is to provide a device of this character having a diaphragm-controlled valve-actuating lever which is pivoted at a knife edge fulcrum to minimize resistance to movement of the lever responsive to small increments of movement of the diaphragm.

A further object is to provide a device of this character that is sensitive to small changes in liquid pressure in a system and which is capable of controlling the level of the water in a system wherein water pressure variations are of small magnitude, such as variations in pressure as little as a fraction of an inch of water in the outlet where the water column of the system extends only slightly, i.e. a few inches above the regulator.

A further object is to provide a device of this character having a housing spanned by a diaphragm, wherein water is retained in the housing at one side of the diaphragm to ensure that the water-containing part of the unit is always filled with water, so that no air voids exist and a true response of the device occurs incident to variations in the height of the water level of the system being regulated.

Other objects will be apparent from the following specification.

BRIEF DESCRIPTION OF THE DRAWINGS

FIG. 1 is a perspective view of one embodiment of the device with parts broken away.

FIG. 3 is a fragmentary or detail view of the valve actuating lever of the device as viewed in the direction of the arrows 3—3 in FIG. 2.

FIG. 4 is a fragmentary sectional view taken on line 4—4 of FIG. 3.

FIG. 5 is a sectional view taken on line 5—5 of FIG. 4.

DESCRIPTION OF THE PREFERRED EMBODIMENT

Figure 2:
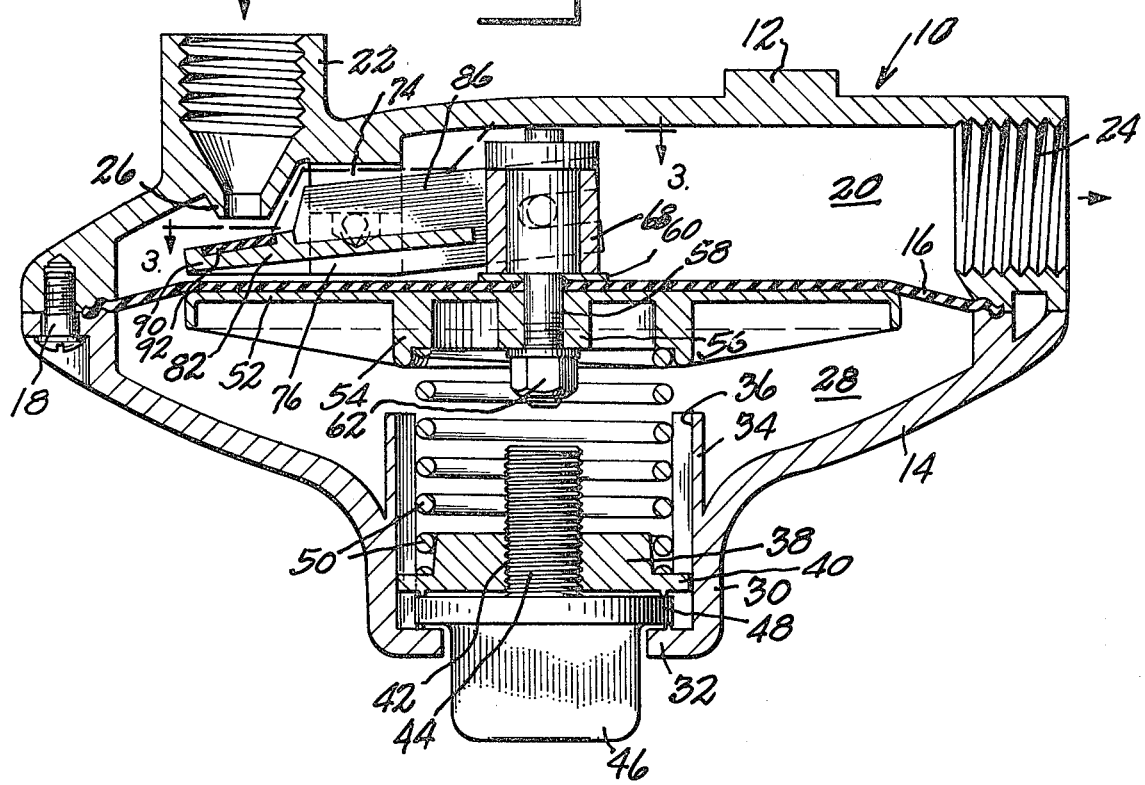
FIG. 2 is a sectional view of the device taken on line 2—2 of FIG. 1 and illustrating one position of the parts of the device.

Briefly stated, the regulator comprises a housing spanned by a diaphragm which is subject to selected spring pressure exerted by pressure adjusting means at one side of the diaphragm, and which is subjected to the pressure of water in the chamber at the opposite side of the diaphragm which is connected to an inlet and an outlet. Valve means control the inlet in response to movement of a lever actuated by the diaphragm. The position of the diaphragm is controlled by the pressure of water on one side of the diaphragm acting against the control spring at the opposite side of the diaphragm.

Referring to the drawings which illustrate a preferred embodiment of the invention, the numeral 10 designates a housing formed of an upper part 12 and a lower part 14. A diaphragm 16 is marginally clamped between the housing parts which are marginally connected by suitable securing means 18. The construction provides a liquid chamber 20 preferably uppermost with which communicates an inlet 22 adapted for connection with a water supply conduit 23. An outlet 24 communicates with chamber 20 and with a liquid dispensing system (not shown) to which a conduit 25 extends. The inlet 22 preferably terminates in an apertured valve seat portion 26 projecting into the housing.

An adjustment or spring chamber 28 is formed in housing 10, preferably below the diaphragm 16. The lower housing part 14 preferably includes a central neck portion 30 projecting outwardly and terminating in an inwardly projecting annular or flange portion 32. A cylindrical guide 34 projects inwardly from the neck 30 and is preferably provided with one or more internal longitudinal guide grooves or channels 36.

Figure 6:
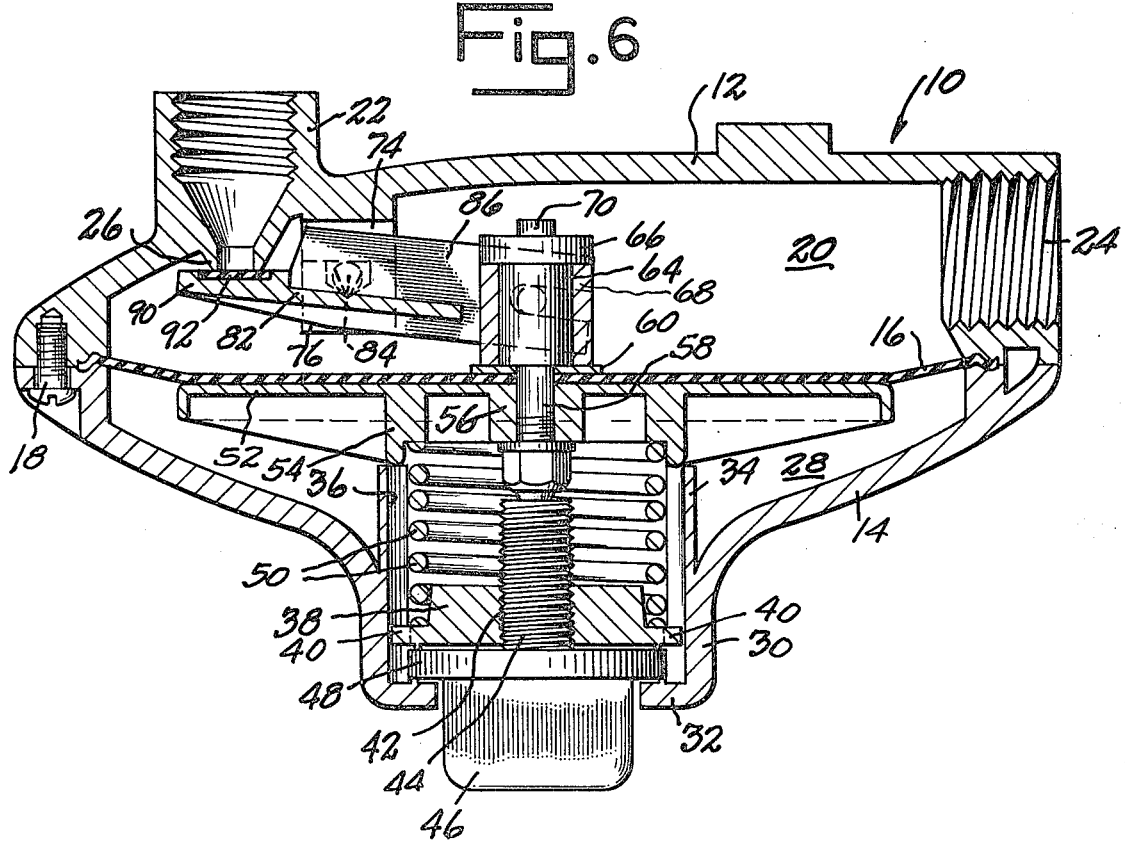
FIG. 6 is a sectional view taken on line 2—2 of FIG. 1 and illustrating another operating position of the parts of the device.

A spring abutment member 38 is slidable in the neck 30 and guide 34 and preferably includes a lug 40 seated and slidable within each guide groove 36. Spring abutment member 38 has a central screw threaded bore 42 in which is threaded an adjustment screw 44 having an actuating knob or hand grip 46 projecting with clearance through the aperture in flange 32. Grip 46 has an enlarged disk portion 48 adapted to bear upon the inner surface of the flange 32. Part 48 provides a stop limiting adjustment of the abutment member 38 in one direction at the position illustrated in FIG. 2 to provide a minimum setting or adjustment of the tension of a coil spring 50 positioned within the guide 34 and abutting the abutment member 38 at its lower end. Member 38 preferably has a reduced portion around which the lower end of the coil spring may fit, as illustrated in FIGS. 2 and 6.

A rigid disk 52 bears against the diaphragm 16 and preferably includes an annular depending rib or portion 54 which preferably has an internal annular shoulder at its lower end to provide a seat against which the upper end of the spring 50 may abut. Disk 52 may also include a central tubular disk projection 56.

Valve actuating means are carried by diaphragm 16 and constitute a valve mounting lever and a lever actuator. The lever actuator may consist of an actuator stem 58 extending through tubular disk portion 56, through the diaphragm and through a washer 60 bearing on the upper face of the diaphragm. Stem 58 is preferably screw threaded at its lower end to accomodate a nut 62. The stem includes an intermediate enlarged portion 64 bearing against the washer 60 so that tightening of the nut 62 will clamp the diaphragm firmly between the washer 60 and disk 52 to seal the connection of stem 58 with the diaphragm. Stem 58 also includes an upper retainer flange 66 for retaining a collar 68 which rotatably encircles the intermediate stem part 64. At its upper end the stem preferably has an upwardly projecting end part 70 adapted to abut the upper wall of housing part 12 to limit upward movement of the stem, as illustrated in FIG. 2. Collar 68 is provided with opposed laterally projecting pins or lugs 72 intermediate its length.

Housing part 12 is provided with a pair of spaced downwardly projecting ribs 74 to each of which is secured a fulcrum block 76, as by means of securing screw 78. Each block 76 is provided with a recess characterized by a V-shaped bottom surface 80. The fulcrum receiving recesses are complementary and are arranged in aligned and opposing positions as best illustrated in FIGS. 3, 4 and 5. A valve lever 82 fits freely between ribs 74 and fulcrum blocks 76 and has projecting therefrom intermediate its length opposed projections 84 which seat in the recesses 80 and each of which is preferably V-shaped at its lower surface to seat in the center of the V-shape surface 80 and thereby provide a knife edge type of fulcrum for the lever. Lever 82 is preferably of substantially H-shape in cross section as best seen in FIG. 5, being characterized by longitudinal marginal rib or flange portions 86 from which the projections 84 extend. The flanges or ribs 86 project endwise beyond one end of the central portion of the lever to define a forked construction adapted to fit around the collar 68. Each projecting fork arm has a longitudinal central slot cutout 88 having a snug fit around a pin or lug 72 on the collar 68 and which is of a length sufficient to accomodate free pivoting of the lever 82 incident to movement of the actuator collar 68 between the positions illustrated in FIGS. 2 and 6. The other end portion 90 of the lever projects to a position below the valve seat 26 and is recessed or cup shaped to receive and mount a resilient disk 92 concentric with and adapted to sealingly engage the valve seat portion 26 of the housing in a sealing position of the parts, as illustrated in FIG. 6.

In the operation of the device, it is mounted at a predetermined level or elevation relative to the level or elevation of the outlets of the liquid supply system, as at an elevation from 6 to 12 inches below the level of watering cups (not shown) with which outlet 25 is connected. The inlet conduit 23 will be connected to a supply line of any selected liquid pressure which is a substantially constant pressure. As liquid enters the chamber 20 from the supply line 23 when the system is placed in operation, the unit will be in the position illustrated in FIG. 2, allowing free flow of liquid from the supply pipe 23 into the chamber 20 and thence through outlet pipe 25 to various outlets, such as the watering cups of a poultry watering system. The outlet 24 is preferably at the upper level of the housing chamber 20 so that the chamber 20 will be filled with water before water reaches the elevated outlets (not shown) of the liquid system.

The tension of the spring 50 will be set to a desired value by rotation of the grip 46 to position the spring abutment 38 in selected position in chamber 28, said adjustment being determined by the liquid level desired at the outlets of the liquid system, as at elevated watering cups. As liquid in the system approaches the desired elevation, the liquid weight and pressure acting on the diaphragm 16 overcomes the force exerted by spring 50 and causes movement of the diaphragm toward the position illustrated in FIG. 6 at which the valve disk 92 seats against the valve seat 26 and closes the water supply line 22–23. The valve remains closed until such time as liquid in the system, as in watering cups, is lowered sufficiently to lower the pressure acting upon the diaphragm to a point where the diaphragm is moved by the force exerted by spring 50, so that lever 82 is pivoted counter-clockwise as viewed in FIG. 6 to disengage the valve disk 92 from the valve seat 26 and permit flow of an additional quantity of liquid from supply line 23 into chamber 20 and the system which the device regulates.

Alternate changes of liquid pressure on the diaphragm greater and less than the pressure exerted by the spring 50 periodically supplies liquid to chamber 20 and the regulated liquid system upon each opening of the valve for accumulation of liquid in the system until the accumulated liquid depresses or shifts the diaphragm 16 to the FIG. 6 position. As the liquid in the system being controlled is depleted, a small variation in the liquid level in the regulated system will thus cause opening of the valve. The device can be rendered sensitive to any selected small variation in the liquid level of the regulated system by adjustment of the tension of the spring 50, which can be effected micrometrically by rotation of the hand grip 46.

It will be observed that no liquid penetrates the diaphragm 16 and that, if the device is mounted at a slightly lower elevation than the outlets of the system which it regulates, the chamber 20 can be maintained full of liquid at all times so as to avoid the occurrence of air voids in the chamber 20. This ensures true response of the device to variations of the liquid level of the system being regulated. The sensitivity of the unit is great and can be regulated by changing the location of the fulcrum for the lever along the length thereof. This sensitivity is the result of various factors including the knife edge fulcrum of the lever. The lever arrangement permits only a limited opening of the valve 26-92 incident to a small change in the pressure acting against the diaphragm, as by a small extent of lowering of the liquid level in the regulated system, so as to permit entry of liquid through a part only of the cross sectional area of the valve seat 26.

The adjustment of the pressure exerted by the spring 50 is positive. The position of the spring 50 is maintained coaxial with the housing part 34 and aligned with the stem 58 in all phases of operation of the device and during all adjustments of the tension of the spring. Note in this connection that the spring abutment member 38 is retained against rotation by the lugs 40 thereof in grooves 36 while spring tension adjusting movement is guided by the arrangement of the parts including the exertion of spring pressure to maintain grip part 48 seated on housing flange 32. Also it will be noted that the arrangement ensures that spring 50 will not be rotated and will not apply any rotative force to the diaphragm 16.

The sensitivity of the device to small changes to the level of the liquid in the regulated system provides for frequent adjustment of the liquid level in the system and permits frequent supply of small quantities of liquid to outlets, such as watering cups of small volume. Small outlets or cups ensure minimum exposure of the water in such outlets to air and thus minimize reaction of water to the air so that the water ingested by poultry is always fresh. This feature also ensures that exposure of air to water of compositions containing minerals or to material which normally promotes the growth of algae or creates a brackish water condition is minimized, so as to ensure a healthful water supply and to reduce the frequency at which an attendant must inspect the outlets to check for undesired algae or brackish conditions.

While a preferred embodiment of the invention has been illustrated or described, it will be understood that changes in the construction may be made within the scope of the appended claims without departing from the spirit of the invention.

What I claim is:

1. A regulator for controlling the liquid level in a system having a discharge part located at an elevation higher than the elevation of the regulator comprising a housing, a diaphragm spanning said housing to define an upper liquid chamber and an opposed lower chamber, liquid supply and liquid discharge means carried by said housing and communicating only with said upper liquid chamber, said liquid chamber containing a fulcrum support and a valve seat associated with said supply means and spaced from said fulcrum support, adjustable spring means in said opposed chamber bearing on said diaphragm, a lever fulcrumed on said support in said liquid chamber having one end connected to and responsive to variations in the position of said diaphragm incident to changes of the weight of liquid acting on said diaphragm, and a valve element carried by the opposite end of said lever and adapted in one position of said lever to abut said valve seat and seal said water supply means, said diaphragm mounting a lever-actuating stem including a rotatable collar having laterally projecting lever abutment means, said lever including a bifurcated end portion fitting freely around said collar and slotted to receive said projecting lever abutment means with slight clearance.

* * * * *